United States Patent [19]

Okawa

[11] 4,257,679
[45] Mar. 24, 1981

[54] REPRODUCING OBJECTIVE FOR VIDEO DISKS

[75] Inventor: Kaneyas Okawa, Tokyo, Japan

[73] Assignee: Olympus Optical Co., Ltd., Tokyo, Japan

[21] Appl. No.: 64,870

[22] Filed: Aug. 8, 1979

[30] Foreign Application Priority Data

Aug. 17, 1978 [JP] Japan .................................. 53-99458

[51] Int. Cl.³ ............................................... G02B 9/34
[52] U.S. Cl. ...................................... 350/469; 350/414
[58] Field of Search ........................ 350/220, 175 ML

[56] References Cited

U.S. PATENT DOCUMENTS

| | | |
|---|---|---|
| 3,915,559 | 10/1975 | Fleischman .......................... 350/220 |
| 3,942,877 | 3/1976 | Fleischman .......................... 350/220 |
| 3,944,338 | 3/1976 | Fleischman .......................... 350/220 |

*Primary Examiner*—Paul A. Sacher
*Attorney, Agent, or Firm*—Cushman, Darby & Cushman

[57] ABSTRACT

A reproducing objective for video disks comprising a first, second, third and fourth lenses, the first lens being a plano-convex lens, the second lens being a plano-concave lens, the third lens being a positive lens, the fourth lens being a positive meniscus lens, the reproducing objective for video disks having high resolving power and long working distance.

8 Claims, 8 Drawing Figures

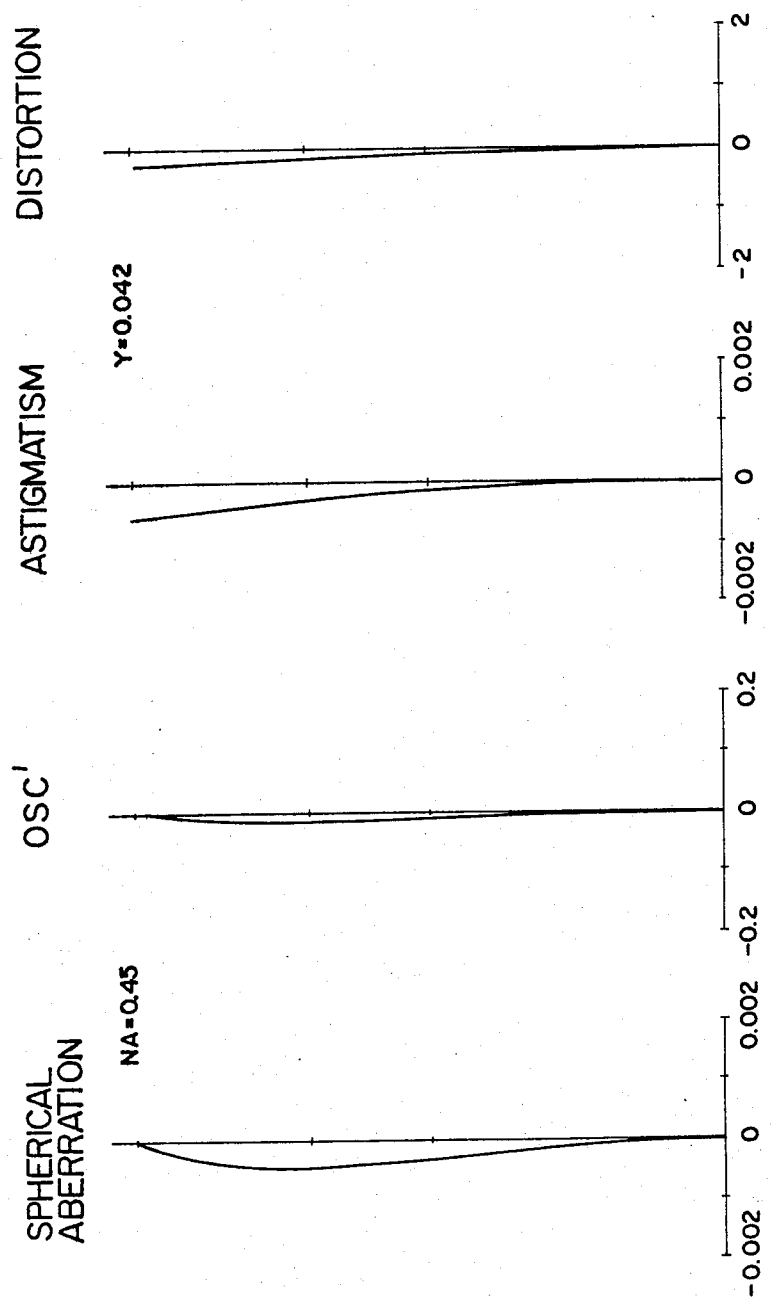

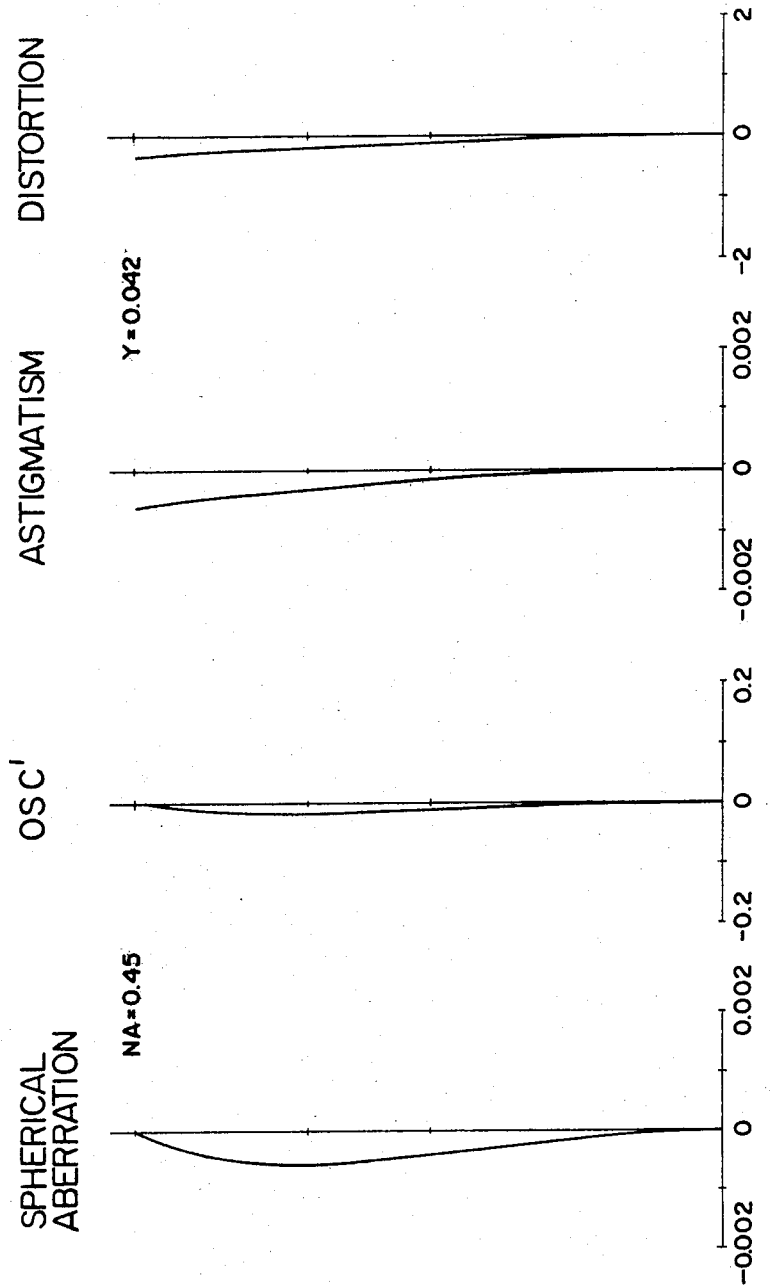

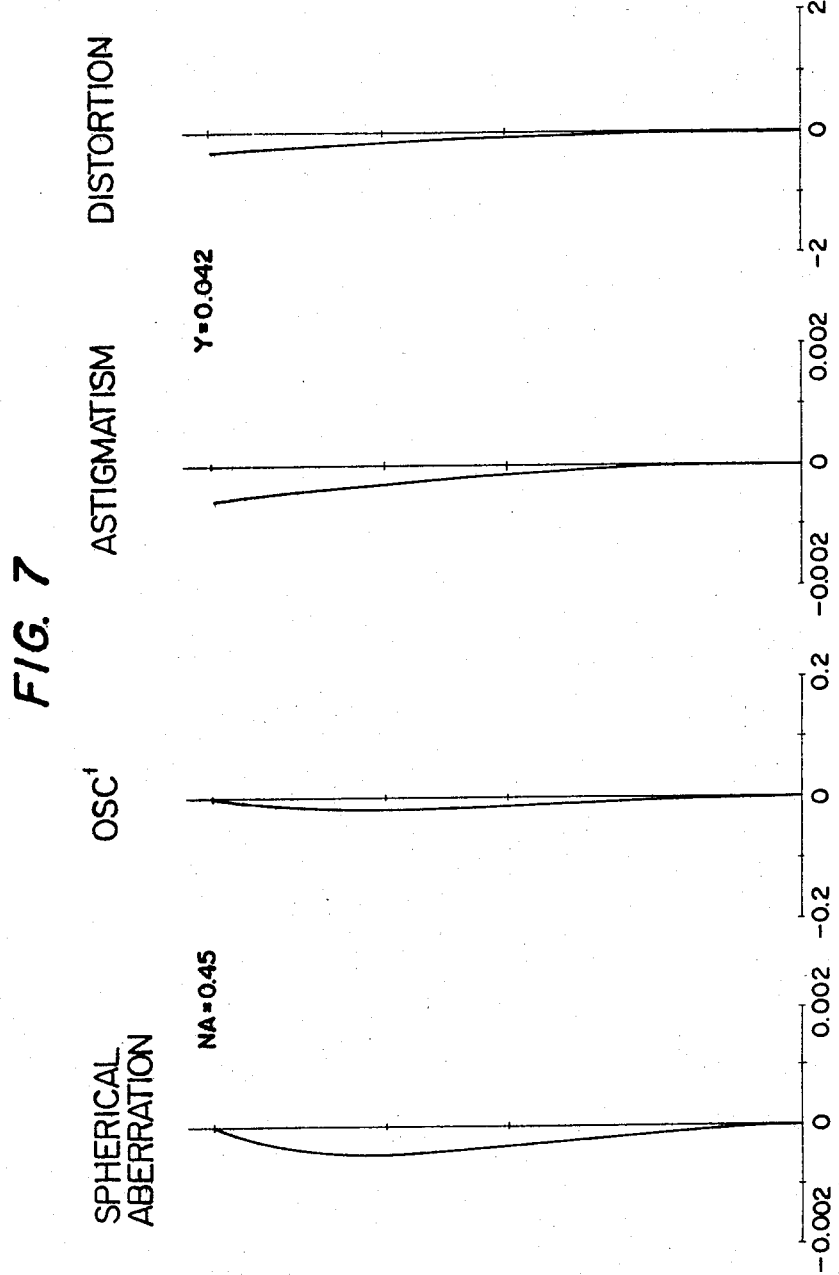

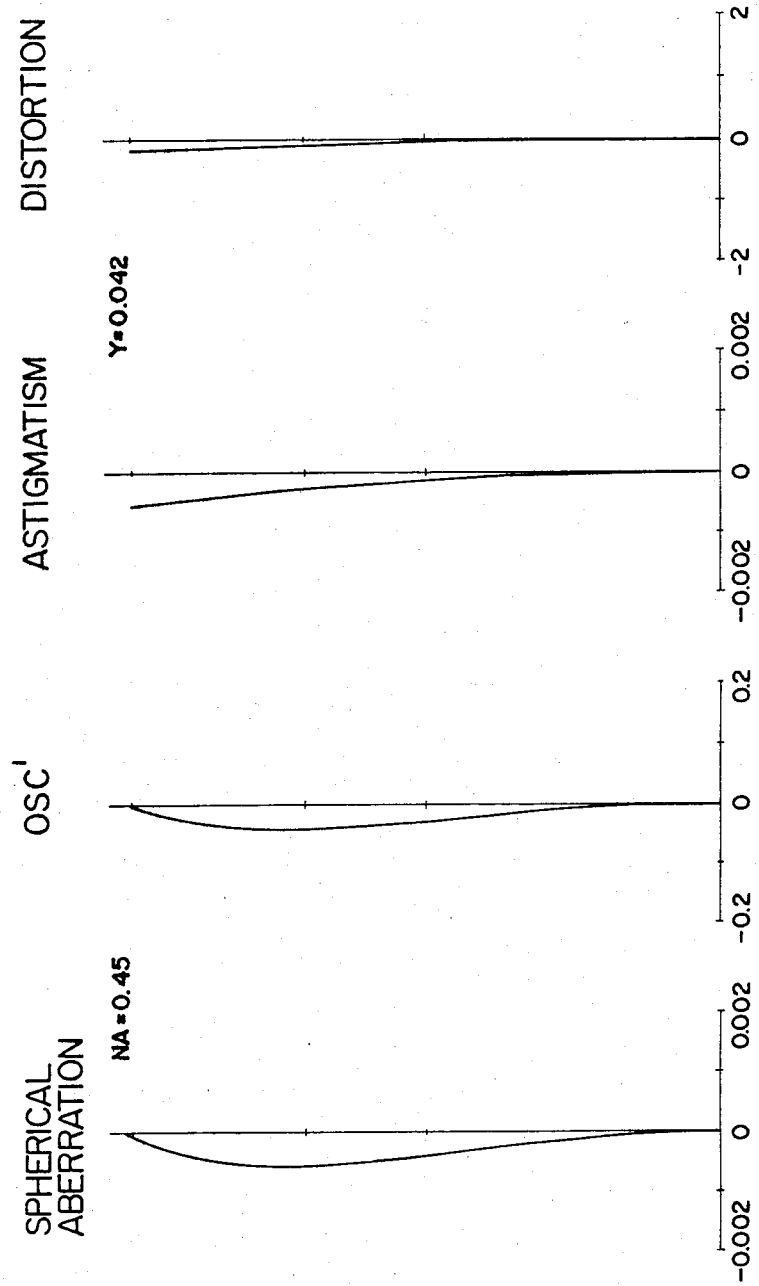

REPRODUCING OBJECTIVE FOR VIDEO DISKS

BACKGROUND OF THE INVENTION (a) Field of the Invention

The present invention relates to an objective for video disks and, more particularly to an objective for reading out the signals recorded on high-density information-recording disks (video disks).

(b) Description of the Prior Art

For objectives to be used in reproducing systems for video disks, it is required to warrant resolving power of 1μ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda = 6328$ Å), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

Though there are some known objectives for video disks which meet the above-mentioned requirements, they are not yet satisfactory enough in the following points. Generally, for the objectives for video disks, the working distance should be long enough for protecting the surface of video disk. However, for the known objectives for video disks, the working distances are 0.26f to 0.36f and these values are smaller than the required value. Besides, the objectives for video disks should be low in price. But, the known objectives for video disks are not satisfactorily low in price.

SUMMARY OF THE INVENTION

It is, therefore, a primary object of the present invention to provide a reproducing objective for video disks which has high resolving power equal to or higher than the known objective for video disks, the working distance of which is longer than the known objectives and in which respective lenses constituting the lens system are arranged so that the objective can be produced at low cost.

The reproducing objective for video disks according to the present invention are arranged so that some of lenses constituting the lens system have flat surfaces on one side in order to reduce the cost of production. That is, the reproducing objective for video disks according to the present invention comprises a first, second, third and fourth lenses in the other from the reproducing light source side, the first lens being a plano-convex lens, the second lens being a plano-concave lens, the third lens being a positive lens, the fourth lens being a positive meniscus lens. Besides, the objective for video disks according to the persent invention satisfies the following conditions.

(1) $1.7f > f_1 > 2.1f$
(2) $-4.3f > f_2 > -3.5f$
(3) $1.4f > f_4 > 1.9f$
(4) $r_2 = \infty$
(5) $r_4 = \infty$
(6) $0.5f > r_8 > 1.7f$
(7) $d_2 > 0.1f$
(8) $0.6f > d_4$ In the above-mentioned conditions, reference symbol f represents the focal length of the lens system as a whole, reference symbols $f_1$, $f_2$ and $f_4$ respectively represent the focal lengths of the first, second and fourth lenses, reference symbol $r_2$ represents the radius of curvature of the surface on the disk side of the first lens, reference symbol $r_4$ represents the radius of curvature of the surface on the disk side of the second lens, reference symbol $r_8$ represents the radius of curvature of the surface on the disk side of the fourth lens, reference symbol $d_2$ represents the airspace between the first and second lenses, and reference symbol $d_4$ represents the airspace between the second and third lenses.

Out of the above-mentioned conditions, the condition (1) relates to spherical aberration of the first lens. To correct astigmatism, which is caused by the third and fourth lenses, by means of the other lenses so that astigmatism of the lens system as a whole is corrected favourably, the shape of the first lens is restricted to some extent. As a result, spherical aberration is caused by the first lens. The condition (1) relates to the above-mentioned spherical aberration. If, in this condition, $f_1$ becomes smaller than 1.7f, negative spherical aberration to be caused by the first lens becomes too large and it will be impossible to correct it by the other lenses. If $f_1$ becomes larger than 2.1f, it becomes impossible to correct astigmatism, which is caused by the third and fourth lenses, even if the focal length $f_2$ of the second lens is selected as any value. Moreover, as negative spherical aberration to be caused by the first lens becomes too small, it becomes difficult to favourably correct spherical aberration of the lens system as a whole when taking spherical aberration of the other lenses into consideration.

The condition (2) is established for the purpose of making the second lens cause positive spherical aberration of adequate value in order to thereby correct negative spherical aberration which occurs at the first lens. If the focal length $f_2$ of the second lens becomes smaller than $-4.3f$, spherical aberration of the lens system as a whole will be undercorrected. If, on the contrary, $f_2$ becomes larger than $-3.5f$, spherical aberration of the lens system as a whole will be overcorrected.

The condition (3) is established for the purpose of correcting astigmatism. If, in the condition (3), $f_4$ becomes smaller than 1.4f, astigmatism will be undercorrected. If, on the contrary, $f_4$ becomes larger than 1.9f, astigmatism will be overcorrected.

The conditions (4) and (5) are established for the purpose of producing the lenses easily by arranging the surfaces on the disk side of the first and second lenses as flat surfaces. Thus, it is possible to produce the lenses at low cost, which is one of objects of the present invention.

The condition (6) relates to curvature of field. When the radius of curvature $r_8$ of the surface on the disk side of the fourth lens is made small, it is advantageous for making the working distance long. That is, the working distance becomes longer when $r_8$ is made smaller. If, however, $r_8$ is made too small and it becomes $r_8 > 0.5f$, curvature of field will be overcorrected. If, on the other hand, $r_8$ becomes larger than $1.7f$, curvature of field will be undercorrected.

The condition (7) is established on the premise that the circumferential portion of the surface on the light source side of the second lens is to be kept in direct contact with the flat surface of the first lens. When this condition is satisfied, it is not necessary to insert a spacer ring between the first and second lenses and, therefore, it is possible to assemble the lenses to the design value accurately and easily. Moreover, by the condition (7) in combination with the fact that the surfaces on the disk side of the first and second lenses are respectively arranged as flat surfaces as defined by the conditions (4) and (5), it is possible to adjust the alignment of lenses in the lens system very easily. As explained in the above, the conditions (4), (5) and (7) are established for the purposes of reducing the number of parts and number of processes, simplifying the manufacturing work, enabling to easily manufacture to the design value, reducing the price and so forth.

As for the condition (8), the lens system as a whole becomes more compact when the airspace $d_4$ between the second and third lenses is smaller. If, however, it becomes $d_4 > 0.6f$, coma and curvature of field will be caused and it will become impossible to correct them by the other surfaces. When $d_4$ is made larger, it is possible to make the working distance longer. In case of the lens system according to the present invention, the working distance is $0.3f$ to $0.5f$.

BRIEF DESCRIPTION OF THE DRAWINGS

FIGS. 2 through 8 respectively show graphs illustrating aberration curves of respective embodiments of the present invention.

DESCRIPTION OF THE PREFERRED EMBODIMENTS

Figure 1:
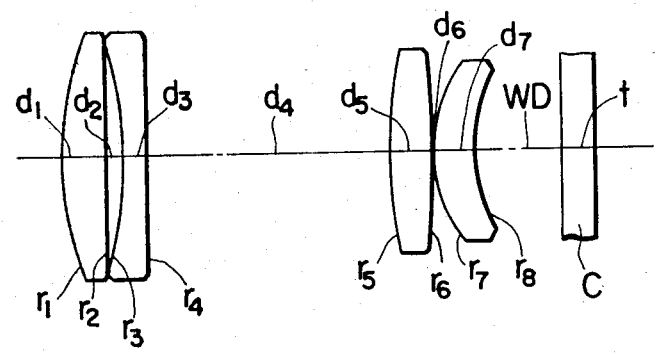
FIG. 1 shows a sectional view of the reproducing objective for video disks according to the present invention.
Figure 2:
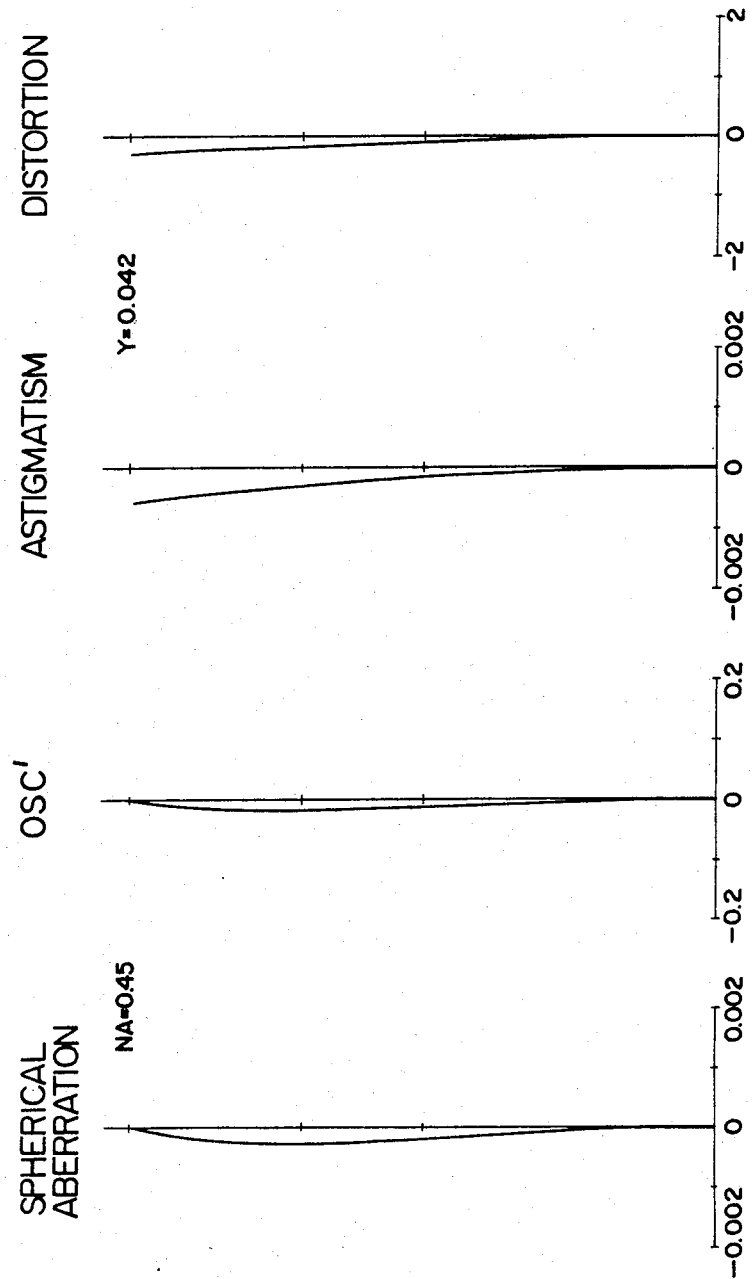
Figure 3:
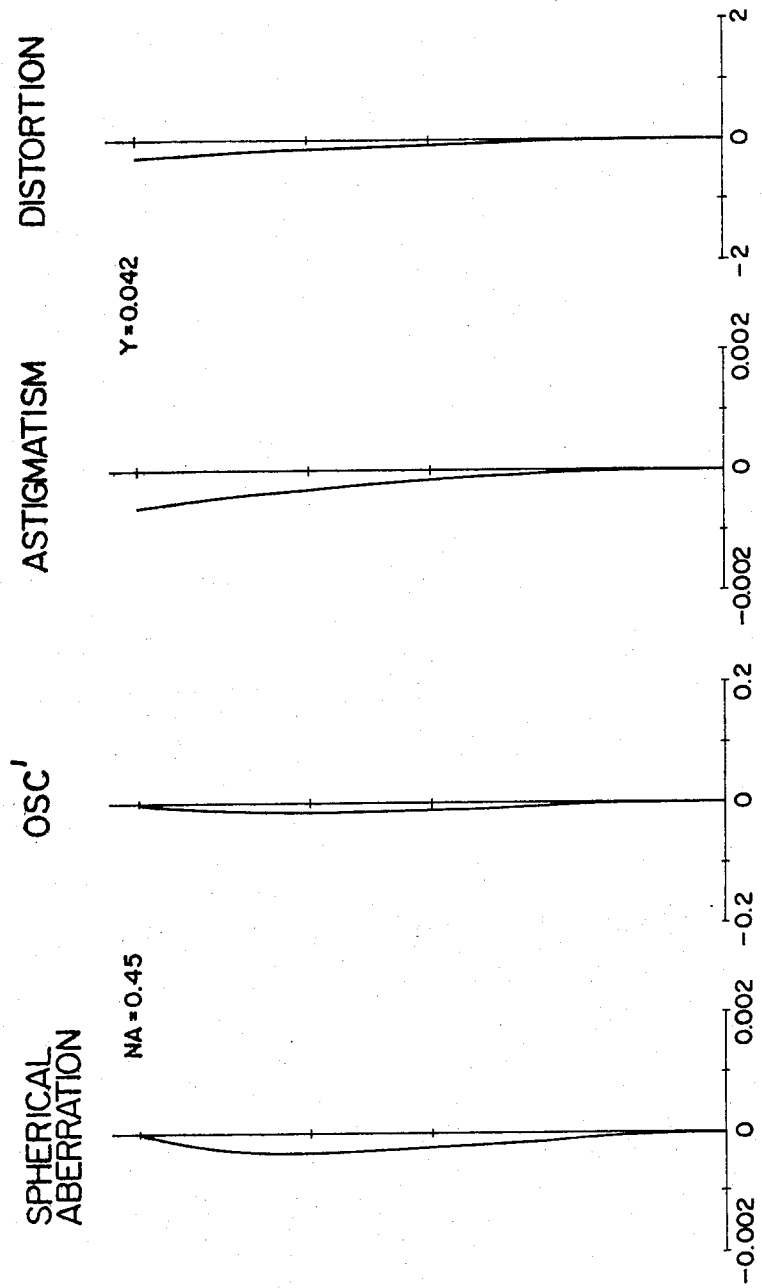
Figure 4:
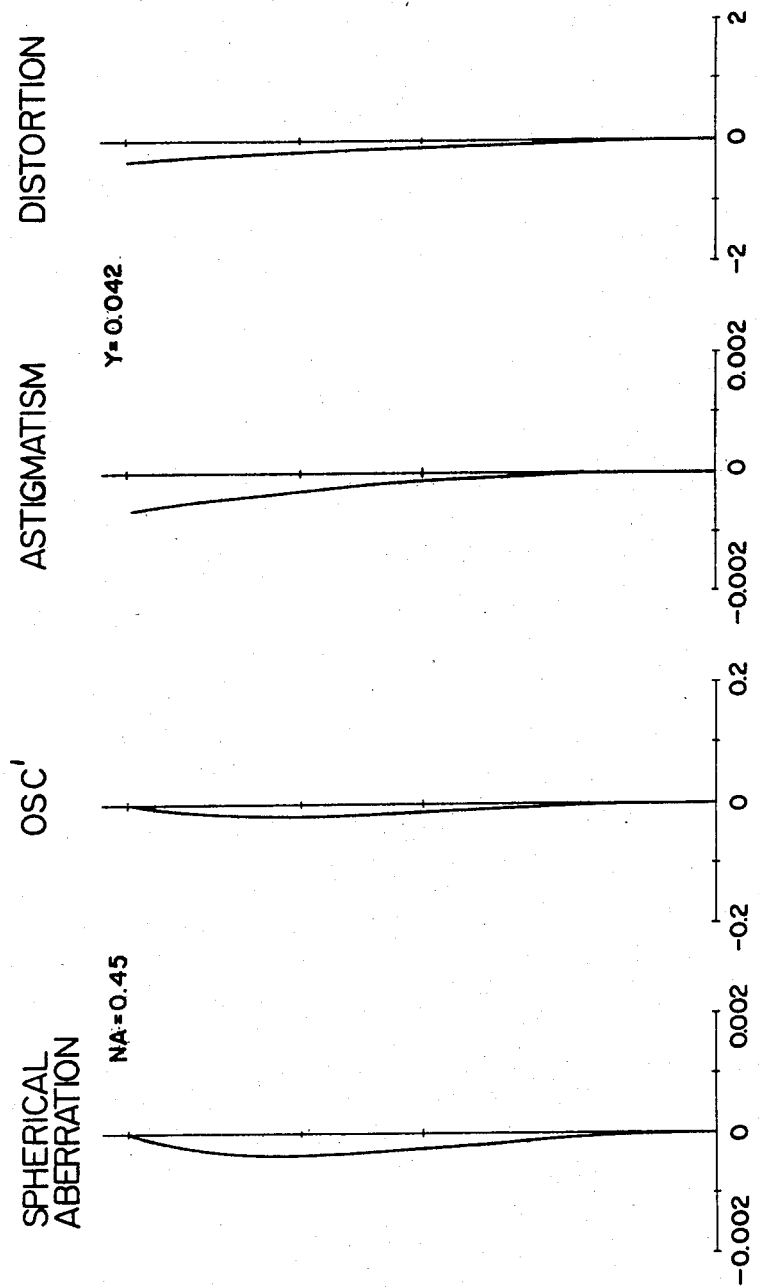

Now, the preferred embodiments of the reproducing objective for video disks according to the present invention explained in the above are shown below.

| Embodiment 1 | | | |
|---|---|---|---|
| $r_1 = 1.5200$ | | | |
| | $d_1 = 0.2372$ | $n_1 = 1.77861$ | $\nu_1 = 25.71$ |
| $r_2 = \infty$ | | | |
| | $d_2 = 0.0593$ | | |
| $r_3 = -1.9855$ | | | |
| | $d_3 = 0.1186$ | $n_2 = 1.51462$ | $\nu_2 = 64.15$ |
| $r_4 = \infty$ | | | |
| | $d_4 = 1.0081$ | | |
| $r_5 = 1.5602$ | | | |
| | $d_5 = 0.1779$ | $n_3 = 1.77861$ | $\nu_3 = 25.71$ |
| $r_6 = -5.9979$ | | | |
| | $d_6 = 0.0119$ | | |
| $r_7 = 0.5087$ | | | |
| | $d_7 = 0.1542$ | $n_4 = 1.77861$ | $\nu_4 = 25.71$ |
| $r_8 = 0.6823$ | | | |
| | W.D = 0.3914 | | |

-continued

| Embodiment 1 | | |
|---|---|---|
| | $t = 0.1305$ | $n_f = 1.51$ |
| $f = 1$ | $\beta = -1/14$ | N.A(disk side) = 0.45 |
| | $f_1 = 1.9522$ | |
| | $f_2 = -3.8583$ | |
| | $f_3 = 1.6067$ | |
| | $f_4 = 1.8500$ | |
| | $\Sigma d = 1.7672$ | |

| Embodiment 2 | | | |
|---|---|---|---|
| $r_1 = 1.5414$ | | | |
| | $d_1 = 0.2378$ | $n_1 = 1.77861$ | $\nu_1 = 25.71$ |
| $r_2 = \infty$ | | | |
| | $d_2 = 0.0595$ | | |
| $r_3 = -1.9040$ | | | |
| | $d_3 = 0.1189$ | $n_2 = 1.51462$ | $\nu_2 = 64.15$ |
| $r_4 = \infty$ | | | |
| | $d_4 = 0.9276$ | | |
| $r_5 = 1.9428$ | | | |
| | $d_5 = 0.1784$ | $n_3 = 1.77861$ | $\nu_3 = 25.71$ |
| $r_6 = -4.9656$ | | | |
| | $d_6 = 0.0951$ | | |
| $r_7 = 0.5191$ | | | |
| | $d_7 = 0.1546$ | $n_4 = 1.77861$ | $\nu_4 = 25.71$ |
| $r_8 = 0.7852$ | | | |
| | W.D = 0.3924 | | |
| | $t = 0.1308$ | $n_f = 1.51$ |
| $f = 1$ | $\beta = -1/14$ | N.A(disk side) = 0.45 |
| | $f_1 = 1.9795$ | |
| | $f_2 = -3.6998$ | |
| | $f_3 = 1.8140$ | |
| | $f_4 = 1.5682$ | |
| | $\Sigma d = 1.7719$ | |

| Embodiment 3 | | | |
|---|---|---|---|
| $r_1 = 1.4580$ | | | |
| | $d_1 = 0.2366$ | $n_1 = 1.77861$ | $\nu_1 = 25.71$ |
| $r_2 = \infty$ | | | |
| | $d_2 = 0.0592$ | | |
| $r_3 = -1.9571$ | | | |
| | $d_3 = 0.1183$ | $n_2 = 1.51462$ | $\nu_2 = 64.15$ |
| $r_4 = \infty$ | | | |
| | $d_4 = 0.9227$ | | |
| $r_5 = 1.6686$ | | | |
| | $d_5 = 0.1775$ | $n_3 = 1.77861$ | $\nu_3 = 25.71$ |
| $r_6 = -5.3343$ | | | |
| | $d_6 = 0.0946$ | | |
| $r_7 = 0.4583$ | | | |
| | $d_7 = 0.1183$ | $n_4 = 1.77861$ | $\nu_4 = 25.71$ |
| $r_8 = 0.6306$ | | | |
| | W.D = 0.3667 | | |
| | $t = 0.1301$ | $n_f = 1.51$ |
| $F = 1$ | $\beta = -1/14$ | N.A(disk side) = 0.45 |
| | $f_1 = 1.8727$ | |
| | $f_2 = -3.8029$ | |
| | $f_3 = 1.6507$ | |
| | $f_4 = 1.6567$ | |
| | $\Sigma d = 1.7272$ | |

| Embodiment 4 | | | |
|---|---|---|---|
| $r_1 = 1.4482$ | | | |
| | $d_1 = 0.1779$ | $n_1 = 1.77861$ | $\nu_1 = 25.71$ |
| $r_2 = \infty$ | | | |
| | $d_2 = 0.0474$ | | |
| $r_3 = -2.1026$ | | | |
| | $d_3 = 0.1186$ | $n_2 = 1.51462$ | $\nu_2 = 64.15$ |
| $r_4 = \infty$ | | | |
| | $d_4 = 0.9834$ | | |
| $r_5 = 2.0859$ | | | |
| | $d_5 = 0.1779$ | $n_3 = 1.77861$ | $\nu_3 = 25.71$ |
| $r_6 = -5.2958$ | | | |

Embodiment 4 (continued)

| | | | |
|---|---|---|---|
| $r_7 = 0.5147$ | $d_6 = 0.0119$ | | |
| | $d_7 = 0.1542$ | $n_4 = 1.77861$ | $\nu_4 = 25.71$ |
| $r_8 = 0.7703$ | | | |

W.D. = 0.3913
t = 0.1305   $n_t = 1.51$
$f = 1$   $\beta = -1/14$   N.A(disk side) = 0.45
$f_1 = 1.8599$
$f_2 = -4.0858$
$f_3 = 1.9425$
$f_4 = 1.5759$
$\Sigma d = 1.6713$

Embodiment 5

| | | | |
|---|---|---|---|
| $r_1 = 1.3664$ | | | |
| | $d_1 = 0.2369$ | $n_1 = 1.77861$ | $\nu_1 = 25.71$ |
| $r_2 = \infty$ | | | |
| | $d_2 = 0.0474$ | | |
| $r_3 = -2.0923$ | | | |
| | $d_3 = 0.1184$ | $n_2 = 1.51462$ | $\nu_2 = 64.15$ |
| $r_4 = \infty$ | | | |
| | $d_4 = 0.9237$ | | |
| $r_5 = 2.3052$ | | | |
| | $d_5 = 0.1776$ | $n_3 = 1.77861$ | $\nu_3 = 25.71$ |
| $r_6 = -5.0286$ | | | |
| | $d_6 = 0.0545$ | | |
| $r_7 = 0.4654$ | | | |
| | $d_7 = 0.1776$ | $n_4 = 1.77861$ | $\nu_4 = 25.71$ |
| $r_8 = 0.6590$ | | | |

W.D = 0.3079
t = 0.1303   $n_t = 1.51$
$f = 1$   $\beta = -1/14$   N.A(disk side) = 0.45
$f_1 = 1.7550$
$f_2 = -4.0658$
$f_3 = 2.0519$
$f_4 = 1.4519$
$\Sigma d = 1.7361$

Embodiment 6

| | | | |
|---|---|---|---|
| $r_1 = 1.4173$ | | | |
| | $d_1 = 0.2376$ | $n_1 = 1.77861$ | $\nu_1 = 25.71$ |
| $r_2 = \infty$ | | | |
| | $d_2 = 0.0475$ | | |
| $r_3 = -2.0160$ | | | |
| | $d_3 = 0.1188$ | $n_2 = 1.51462$ | $\nu_2 = 64.15$ |
| $r_4 = \infty$ | | | |
| | $d_4 = 0.9265$ | | |
| $r_5 = 2.0045$ | | | |
| | $d_5 = 0.1782$ | $n_3 = 1.77861$ | $\nu_3 = 25.71$ |
| $r_6 = -4.8085$ | | | |
| | $d_6 = 0.0950$ | | |
| $r_7 = 0.4644$ | | | |
| | $d_7 = 0.1782$ | $n_4 = 1.77861$ | $\nu_4 = 25.71$ |
| $r_8 = 0.6161$ | | | |

W.D = 0.3088
t = 0.1307   $n_t = 1.51$
$f = 1$   $\beta = -1/14$   N.A(disk side) = 0.45
$f_1 = 1.8204$
$f_2 = -3.9173$
$f_3 = 1.8381$
$f_4 = 1.6001$
$\Sigma d = 1.7818$

Embodiment 7

| | | | |
|---|---|---|---|
| $r_1 = 1.5493$ | | | |
| | $d_1 = 0.2077$ | $n_1 = 1.77861$ | $\nu_1 = 25.71$ |
| $r_2 = \infty$ | | | |
| | $d_2 = 0.0554$ | | |
| $r_3 = -1.8552$ | | | |
| | $d_3 = 0.1154$ | $n_2 = 1.51462$ | $\nu_2 = 64.15$ |
| $r_4 = \infty$ | | | |
| | $d_4 = 0.7603$ | | |
| $r_5 = 1.5493$ | | | |
| | $d_5 = 0.2077$ | $n_3 = 1.77861$ | $\nu_3 = 25.71$ |
| $r_6 = \infty$ | | | |
| | $d_6 = 0.0162$ | | |
| $r_7 = 0.7581$ | | | |
| | $d_7 = 0.1788$ | $n_4 = 1.77861$ | $\nu_4 = 25.71$ |
| $r_8 = 1.5862$ | | | |

W.D = 0.4535
t = 0.1500   $n_t = 1.50$
$f = 1$   $\beta = -1/14$   N.A(disk side) = 0.45
$f_1 = 1.9897$
$f_2 = -3.6050$
$f_3 = 1.9897$
$f_4 = 1.7039$
$\Sigma d = 1.5415$ In the above embodiments, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass C, reference symbol $n_t$ represents the refractive index of the cover glass C, reference symbol f represents the focal length of the lens system as a whole, reference symbols $f_1$, $f_2$, $f_3$ and $f_4$ respectively represent the focal length of the first, second, third and fourth lenses, reference symbol $\beta$ represents magnification, reference symbol N.A. represents the numerical aperture on the disk side, and reference symbol $\Sigma d$ represents the overall length of lens system.

Out of the embodiments shown in the above, Embodiment 7 is arranged so that the surface $r_6$ on the disk side of the third lens also becomes a flat surface in addition to the flat surfaces of the first and second lenses and, therefore, it is more convenient for manufacture.

I claim:

1. A reproducing objective for video disks comprising a first, second, third and fourth lenses, said first lens being a plano-convex lens, said second lens being a plano-concave lens, said third lens being a positive lens, said fourth lens being a positive meniscus lens, said reproducing objective for video disks satisfying the following conditions:

(1) $1.7f > f_1 > 2.1f$
(2) $-4.3f > f_2 > -3.5f$
(3) $1.4f > f_4 > 1.9f$
(4) $r_2 = \infty$
(5) $r_4 = \infty$
(6) $0.5f > r_8 > 1.7f$
(7) $d_2 > 0.1f$
(8) $0.6f > d_4$ wherein reference symbol f represents the focal length of the lens system as a whole, reference symbols $f_1$, $f_2$ and $f_4$ respectively represent the focal lengths of the first, second and fourth lenses, reference symbol $r_2$ represents the radius of curvature of the surface on the disk side of the first lens, reference symbol $r_4$ represents the radius of curvature of the surface on the disk side of the second lens, reference symbol $r_8$ represents the radius of curvature of the surface on the disk side of the fourth lens, reference symbol $d_2$ represents the airspace between the first and second lenses, and reference symbol $d_4$ represents the airspace between the second and third lenses.

2. A reproducing objective for video disks according to claim 1, in which said reproducing objective for video disks has the following numerical data:

| | | | |
|---|---|---|---|
| $r_1 = 1.5200$ | | | |
| | $d_1 = 0.2372$ | $n_1 = 1.77861$ | $\nu_1 = 25.71$ |
| $r_2 = \infty$ | | | |
| | $d_2 = 0.0593$ | | |
| $r_3 = -1.9855$ | | | |
| | $d_3 = 0.1186$ | $n_2 = 1.51462$ | $\nu_2 = 64.15$ |
| $r_4 = \infty$ | | | |
| | $d_4 = 1.0081$ | | |
| $r_5 = 1.5602$ | | | |
| | $d_5 = 0.1779$ | $n_3 = 1.77861$ | $\nu_3 = 25.71$ |
| $r_6 = -5.9979$ | | | |
| | $d_6 = 0.0119$ | | |
| $r_7 = 0.5087$ | | | |
| | $d_7 = 0.1542$ | $n_4 = 1.77861$ | $\nu_4 = 25.71$ |
| $r_8 = 0.6823$ | | | |
| | W.D = 0.3914 | | |
| | $t = 0.1305$ | $n_t = 1.51$ | |
| $f = 1$ | $\beta = -1/14$ | N.A(disk side) = 0.45 | |
| | $f_1 = 1.9522$ | | |
| | $f_2 = -3.8583$ | | |
| | $f_3 = 1.6067$ | | |
| | $f_4 = 1.8500$ | | |
| | $\Sigma d = 1.7672$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal length of the first, second, third and fourth lenses, reference symbol $\beta$ represents magnification, reference symbol N.A. represents the numerical aperture on the image side, and reference symbol $\Sigma d$ represents the overall length of lens system.

3. A reproducing objective for video disks according to claim 1, in which said reproducing objective for video disks has the following numerical data:

| | | | |
|---|---|---|---|
| $r_1 = 1.5414$ | | | |
| | $d_1 = 0.2378$ | $n_1 = 1.77861$ | $\nu_1 = 25.71$ |
| $r_2 = \infty$ | | | |
| | $d_2 = 0.0595$ | | |
| $r_3 = -1.9040$ | | | |
| | $d_3 = 0.1189$ | $n_2 = 1.51462$ | $\nu_2 = 64.15$ |
| $r_4 = \infty$ | | | |
| | $d_4 = 0.9276$ | | |
| $r_5 = 1.9428$ | | | |
| | $d_5 = 0.1784$ | $n_3 = 1.77861$ | $\nu_3 = 25.71$ |
| $r_6 = -4.9656$ | | | |
| | $d_6 = 0.0951$ | | |
| $r_7 = 0.5191$ | | | |
| | $d_7 = 0.1546$ | $n_4 = 1.77861$ | $\nu_4 = 25.71$ |
| $r_8 = 0.7852$ | | | |
| | W.D = 0.3924 | | |

| | | | |
|---|---|---|---|
| | $t = 0.1308$ | $n_t = 1.51$ | |
| $f = 1$ | $\beta = -1/14$ | N.A(disk side) = 0.45 | |
| | $f_1 = 1.9795$ | | |
| | $f_2 = -3.6998$ | | |
| | $f_3 = 1.8140$ | | |
| | $f_4 = 1.5682$ | | |
| | $\Sigma d = 1.7719$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal length of the first, second, third and fourth lenses, reference symbol $\beta$ represents magnification, reference symbol N.A. represents the numerical aperture on the image side, and reference symbol $\Sigma d$ represents the overall length of lens system.

4. A reproducing objective for video disks according to claim 1, in which said reproducing objective for video disks has the following numerical data:

| | | | |
|---|---|---|---|
| $r_1 = 1.4580$ | | | |
| | $d_1 = 0.2366$ | $n_1 = 1.77861$ | $\nu_1 = 25.71$ |
| $r_2 = \infty$ | | | |
| | $d_2 = 0.0592$ | | |
| $r_3 = -1.9571$ | | | |
| | $d_3 = 0.1183$ | $n_2 = 1.51462$ | $\nu_2 = 64.15$ |
| $r_4 = \infty$ | | | |
| | $d_4 = 0.9227$ | | |
| $r_5 = 1.6686$ | | | |
| | $d_5 = 0.1775$ | $n_3 = 1.77861$ | $\nu_3 = 25.71$ |
| $r_6 = -5.3343$ | | | |
| | $d_6 = 0.0946$ | | |
| $r_7 = 0.4583$ | | | |
| | $d_7 = 0.1183$ | $n_4 = 1.77861$ | $\nu_4 = 25.71$ |
| $r_8 = 0.6306$ | | | |
| | W.D = 0.3667 | | |
| | $t = 0.1301$ | $n_t = 1.51$ | |
| $f = 1$ | $\beta = -1/14$ | N.A(disk side) = 0.45 | |
| | $f_1 = 1.8727$ | | |
| | $f_2 = -3.8029$ | | |
| | $f_3 = 1.6507$ | | |
| | $f_4 = 1.6567$ | | |
| | $\Sigma d = 1.7272$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal lengths of the first, second, third and fourth lenses, reference symbol $\beta$ represents magnification, reference symbol N.A. represents the numerical aperture on the image side, and reference symbol $\Sigma d$ represents the overall length of lens system.

5. A reproducing objective for video disks according to claim 1, in which said reproducing objective for video disks has the following numerical data:

| | | | |
|---|---|---|---|
| $r_1 = 1.4482$ | | | |
| | $d_1 = 0.1779$ | $n_1 = 1.77861$ | $\nu_1 = 25.71$ |
| $r_2 = \infty$ | | | |
| | $d_2 = 0.0474$ | | |
| $r_3 = -2.1026$ | | | |
| | $d_3 = 0.1186$ | $n_2 = 1.51462$ | $\nu_2 = 64.15$ |
| $r_4 = \infty$ | | | |
| | $d_4 = 0.9834$ | | |
| $r_5 = 0\ 2.0859$ | | | |
| | $d_5 = 0.1779$ | $n_3 = 1.77861$ | $\nu_3 = 25.71$ |
| $r_6 = -5.2958$ | | | |
| | $d_6 = 0.0119$ | | |
| $r_7 = 0.5147$ | | | |
| | $d_7 = 0.1542$ | $n_4 = 1.77861$ | $\nu_4 = 25.71$ |
| $r_8 = 0.7703$ | | | |
| | W.D = 0.3913 | | |
| | $t = 0.1305$ | $n_t = 1.51$ | |
| $f = 1$ | $\beta = -1/14$ | N.A(disk side) = 0.45 | |
| | $f_1 = 1.8599$ | | |
| | $f_2 = -4.0858$ | | |
| | $f_3 = 1.9425$ | | |
| | $f_4 = 1.5759$ | | |
| | $\Sigma d = 1.6713$ | | | wherein reference symbols $r_1$ through $r_8$ respectively represent radii of curvature of respective lens surfaces, reference symbols $d_1$ through $d_7$ respectively represent thickness of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal length of the first, second, third and fourth lenses, reference symbol $\beta$ represents magnification, reference symbol N.A. represents the numerical aperture on the image side, and reference symbol $\Sigma d$ represents the overall length of lens system.

6. A reproducing objective for video disks according to claim 1, in which said reproducing objective for video disks has the following numerical data:

| | | | |
|---|---|---|---|
| $r_1 = 1.3664$ | | | |
| | $d_1 = 0.2369$ | $n_1 = 1.77861$ | $\nu_1 = 25.71$ |
| $r_2 = \infty$ | | | |
| | $d_2 = 0.0474$ | | |
| $r_3 = -2.0923$ | | | |
| | $d_3 = 0.1184$ | $n_2 = 1.51462$ | $\nu_2 = 64.15$ |
| $r_4 = \infty$ | | | |
| | $d_4 = 0.9237$ | | |
| $r_5 = 2.3052$ | | | |
| | $d_5 = 0.1776$ | $n_3 = 1.77861$ | $\nu_3 = 25.71$ |
| $r_6 = -5.0286$ | | | |
| | $d_6 = 0.0545$ | | |
| $r_7 = 0.4654$ | | | |
| | $d_7 = 0.1776$ | $n_4 = 1.77861$ | $\nu_4 = 25.71$ |
| $r_8 = 0.6590$ | | | |
| | W.D = 0.3079 | | |
| | $t = 0.1303$ | $n_t = 1.51$ | |
| $f = 1$ | $\beta = -1/14$ | N.A(disk side) = 0.45 | |
| | $f_1 = 1.7550$ | | |
| | $f_2 = -4.0658$ | | |
| | $f_3 = 2.0519$ | | |
| | $f_4 = 1.4519$ | | |
| | $\Sigma d = 1.7361$ | | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represent the focal length of the lens system as a whole, reference symbols $f_1$, $f_2$, $f_3$ and $f_4$ respectively represent the focal lengths of the first, second, third and fourth lenses, reference symbol $\beta$ represents magnification, reference symbol N.A represents the numerical aperture on the image side, and reference symbol $\Sigma d$ represents the overall length of lens system.

7. A reproducing objective for video disks according to claim 1, in which said reproducing objective for video disks has the following numerical data:

| | | | |
|---|---|---|---|
| $r_1 = 1.4173$ | | | |
| | $d_1 = 0.2376$ | $n_1 = 1.77861$ | $\nu_1 = 25.71$ |
| $r_2 = \infty$ | | | |
| | $d_2 = 0.0475$ | | |
| $r_3 = -2.0160$ | | | |
| | $d_3 = 0.1188$ | $n_2 = 1.51462$ | $\nu_2 = 64.15$ |
| $r_4 = \infty$ | | | |
| | $d_4 = 0.9265$ | | |
| $r_5 = 2.0045$ | | | |
| | $d_5 = 0.1782$ | $n_3 = 1.77861$ | $\nu_3 = 25.71$ |
| $r_6 = -4.8085$ | | | |
| | $d_6 = 0.0950$ | | |
| $r_7 = 0.4644$ | | | |
| | $d_7 = 0.1782$ | $n_4 = 1.77861$ | $\nu_4 = 25.71$ |
| $r_8 = 0.6161$ | | | |
| | W.D = 0.3088 | | |
| | $t = 0.1307$ | $n_t = 1.51$ | |
| $f = 1$ | $\beta = -1/14$ | N.A(disk side) = 0.45 | |
| | $f_1 = 1.8204$ | | |
| | $f_2 = -3.9173$ | | |
| | $f_3 = 1.8381$ | | |
| | $f_4 = 1.6001$ | | |
| | $\Sigma d = 1.7818$ | | | wherein reference symbols $r_1$ through $r_8$ respectively represent radii of curvature of respective lens surfaces, reference symbols $d_1$ through $d_7$ respectively represent thicknesses of respective lenses and airspaces and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal lengths of the first, second, third and fourth lenses, reference symbol $\beta$ represents magnification, reference symbol N.A. represents the numerical aperture on the image side, and reference symbol $\Sigma d$ represents the overall length of lens system.

8. A reproducing objective for video disks according to claim 1, in which said reproducing objective for video disks has the following numerical data:

| | | | |
|---|---|---|---|
| $r_1 = 1.5493$ | | | |
| | $d_1 = 0.2077$ | $n_1 = 1.77861$ | $\nu_1 = 25.71$ |
| $r_2 = \infty$ | | | |
| | $d_2 = 0.0554$ | | |
| $r_3 = -1.8552$ | | | |
| | $d_3 = 0.1154$ | $n_2 = 1.51462$ | $\nu_2 = 64.15$ |
| $r_4 = \infty$ | | | |
| | $d_4 = 0.7603$ | | |
| $r_5 = 1.5493$ | | | |
| | $d_5 = 0.2077$ | $n_3 = 1.77861$ | $\nu_3 = 25.71$ |
| $r_6 = \infty$ | | | |
| | $d_6 = 0.0162$ | | |
| $r_7 = 0.7581$ | | | |
| | $d_7 = 0.1788$ | $n_4 = 1.77861$ | $\nu_4 = 25.71$ |
| $r_8 = 1.5862$ | | | |
| | W.D = 0.4535 | | |
| | t = 0.1500 | $n_t = 1.50$ | |
| f = 1 | $\beta = -1/14$ | N.A(disk side) = 0.45 | |

-continued

| |
|---|
| $f_1 = 1.9897$ |
| $f_2 = -3.6050$ |
| $f_3 = 1.9897$ |
| $f_4 = 1.7039$ |
| $\Sigma d = 1.5415$ | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at the wavelength of 632.8 nm, reference symbols $\nu_1$, $\nu_2$, $\nu_3$ and $\nu_4$ respectively represent Abbe's numbers of respective lenses for d-line, reference symbol W.D. represents the working distance, reference symbol t represents the thickness of the cover glass, reference symbol $n_t$ represents the refractive index of the cover glass, reference symbol f represents the focal length of the lens system as a whole, reference symbols $f_1$, $f_2$, $f_3$ and $f_4$ respectively represent the focal lengths of the first, second, third and fourth lenses, reference symbol $\beta$ represents magnification, reference symbol N.A represents the numerical aperture on the image side, and reference symbol $\Sigma d$ represents the overall length of lens system.

* * * * *